United States Patent
Kudla et al.

(10) Patent No.: US 8,226,097 B2
(45) Date of Patent: Jul. 24, 2012

(54) INTEGRATED STEERING GEAR, FRAME MEMBER AND ENGINE MOUNT BASE

(75) Inventors: Christopher Kudla, Delaware, OH (US); Paul Choin, Columbus, OH (US); Daniel Vogel, Columbus, OH (US); Kevin LeClair, Dublin, OH (US); Stephen G. Rosepiler, Marysville, OH (US); Joshua C. Johnson, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 278 days.

(21) Appl. No.: 12/558,267

(22) Filed: Sep. 11, 2009

(65) Prior Publication Data

US 2011/0062677 A1    Mar. 17, 2011

(51) Int. Cl.
*B62D 7/00* (2006.01)
*B62D 21/00* (2006.01)
(52) U.S. Cl. ............. 280/93.515; 280/124.109; 180/312
(58) Field of Classification Search ............. 280/93.514, 280/93.515, 124.109, 781, 785; 180/312, 180/400, 428; 29/897.2; 74/498
See application file for complete search history.

(56) References Cited

U.S. PATENT DOCUMENTS

| | | | | |
|---|---|---|---|---|
| 2,961,253 A * | 11/1960 | Allison | ................... | 280/124.106 |
| 3,908,479 A * | 9/1975 | MacDuff | ................... | 74/498 |
| 4,060,011 A * | 11/1977 | Jones | ................... | 74/498 |
| 5,094,425 A * | 3/1992 | Stephens | ................... | 248/605 |
| 5,613,709 A * | 3/1997 | Nakamichi | ................... | 280/777 |
| 5,879,026 A | 3/1999 | Dostert et al. | | |
| 5,997,038 A * | 12/1999 | Dostert et al. | ................... | 280/781 |
| 6,340,162 B1 * | 1/2002 | Hobaugh, II | ................... | 277/594 |
| 6,345,831 B1 * | 2/2002 | deMarcellus | ................... | 280/124.106 |
| 6,425,592 B1 * | 7/2002 | Lee | ................... | 280/93.515 |
| 6,783,157 B2 * | 8/2004 | Huang et al. | ................... | 280/785 |
| 7,258,354 B2 | 8/2007 | Kim et al. | | |
| 7,290,778 B2 * | 11/2007 | Domin | ................... | 280/93.515 |
| 7,384,069 B2 | 6/2008 | Green | | |
| 7,828,110 B2 * | 11/2010 | Shao et al. | ................... | 180/428 |
| 2009/0078490 A1 * | 3/2009 | Shao et al. | ................... | 180/400 |
| 2009/0095559 A1 * | 4/2009 | Mitake | ................... | 180/312 |

FOREIGN PATENT DOCUMENTS

| | | |
|---|---|---|
| JP | 02-306882 | 12/1990 |
| JP | 06-286628 | 10/1994 |

OTHER PUBLICATIONS

"Expeditions West: Trooper front suspension travel, ball joint flip, articulation" available at http://www.expeditionswest.com/equipment/trooper/suspension_travel/Trooper_articulation.html (available via Web-Archive since at least May 4, 2004).*

"sway bar, why remove it—Off-Road Forums & Discussion Groups," available at, http://forums.off-road.com/ford-67-96-f-series-78-96-bronco/10637-sway-bar-why-remove.html(discussion dated Jan. 21, 2000).*

* cited by examiner

*Primary Examiner* — Joseph Rocca
(74) *Attorney, Agent, or Firm* — Gregory J. Burke; Michael A. Forhan; Eley Law Firm CO, LPA

(57) ABSTRACT

An integrated steering gear, frame structure and engine mount base for a vehicle includes an elongate, generally hollow housing having at least one mounting portion at each of opposing ends. A steering gear including a steering gear input and a pair of opposingly-oriented tie rods is assembled within the hollow housing such that the steering gear input and the tie rods extend from the interior of the housing. An engine mount base is integrated into the housing. The integrated steering gear, frame structure and engine mount base is mountable to a vehicle support frame to function as a subframe member of the support frame.

18 Claims, 4 Drawing Sheets

INTEGRATED STEERING GEAR, FRAME MEMBER AND ENGINE MOUNT BASE

FIELD

The present invention relates generally to a steering gear for a vehicle, in particular to a steering gear integrated with a subframe member of a support frame of the vehicle, the subframe member having an engine mount support base.

BACKGROUND

A steering system of a vehicle is a mechanism by which its driver controls the course of travel of the vehicle. The steering system comprises, in general, a steering control wheel, a steering shaft, a steering column and other related components that serve to transmit a driver's manipulation force upon the steering control wheel to a steering gear. The steering gear receives the manipulation force at a steering gear input, increases the magnitude of the force and transmits the amplified force to opposingly-oriented tie rods. The tie rods, in turn, transmit the manipulation force to a linkage mechanism coupled to steerable wheels of the vehicle. The steering gear typically includes a rack-and-pinion steering gear housed in a steering gear box, which is mounted to a support frame of the vehicle.

The general arrangement of a typical steering gear assembly 10 mounted to such a support frame is shown in FIG. 1. In this figure a pair of left- and right-hand longitudinal frame members 12, 14, respectively, are interconnected with a forward cross member 16 and a rear cross member 18, each cross member extending between the frame members. A steering gearbox 20 is mounted to an upper surface of rear cross member 18. A pair of opposingly-oriented tie rods 22 extend from steering gearbox 20. A base bracket 24, having a U-shaped portion that extends around steering gearbox 20, is coupled to rear cross member 18. An engine mount 26 is attached to base bracket 24. Finally, an engine mount bracket 28 is attached to engine mount 26.

A shortcoming of the aforementioned arrangement is that each component of the steering gear assembly must be separately manufactured and assembled. From the standpoint of the vehicle manufacturer each component has a number of cost elements associated with its purchase, distribution and warehousing. It is thus desirable to reduce these cost elements wherever possible by reducing the number of components in the assembly. Furthermore, the labor required to produce each part individually and then assemble them together adds to the overall cost of the steering gear assembly.

Another drawback of current steering gear assemblies is that their constituent parts must often be adapted to fit together, adding weight and further increasing component cost and assembly labor. For example, engine mount 26 of FIG. 1, which is ultimately coupled to rear cross member 18, requires the intermediary base bracket 24 extending between engine mount 26 and rear cross member 18 and shaped to fit around steering gearbox 20. It would be desirable to eliminate base bracket 24 and its associated cost elements and assembly labor.

The components of the steering gear assembly 10 of FIG. 1 must also be assembled in a particular order. Typically, rear cross member 18 is attached to frame members 12, 14. Steering gearbox 20 and tie rods 22 are then assembled to rear cross member 18. Finally, base bracket 24 is assembled to rear cross member 18, along with engine mount 26 and engine mount bracket 28. In the event that any maintenance to steering gear assembly 10 is required, it may be necessary to remove several of these components to gain access to a particular component to be serviced, adding to the maintenance cost of the vehicle. There is a need for a steering gear assembly that is less costly to produce, is easier to maintain, and is lightweight.

SUMMARY

An integrated steering gear, frame structure and engine mount base, according to an embodiment of the present invention, includes a housing sized and shaped to at least partially enclose a steering gear. The housing further includes a mounting base to which an engine mount may be attached. The housing is also configured to extend between a pair of spaced-apart members of a vehicle support frame for attachment to the members, thereby functioning as a subframe member that contributes to the structural support integrity of the vehicle support frame.

According to one embodiment, an elongate, generally hollow housing has an upper surface and at least one mounting portion at each of first and second opposing ends. A steering gear including a steering gear input and a pair of opposingly-oriented tie rods are at least partially disposed within the hollow housing such that the steering gear input and the tie rods extend from the interior of the housing. An engine mount base is integrated into the housing. The steering gear assembly is mountable to a support frame of the vehicle to function as a subframe member of the support frame.

According to one aspect of the invention, a method of integrating a steering gear and frame structure with an engine mount of a vehicle is provided. The method includes the steps of providing an elongate, generally hollow housing having an upper surface and at least one mounting portion at each of first and second opposing ends, and providing a steering gear including a steering gear input and a pair of opposingly-oriented tie rods. The steering gear is at least partially disposed within the hollow housing such that the steering gear input and the tie rods extend from the interior of the housing. An engine mount base is integrated into the housing. The steering gear assembly is mountable to a support frame of the vehicle to function as a subframe member of the support frame.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

Figure 2:
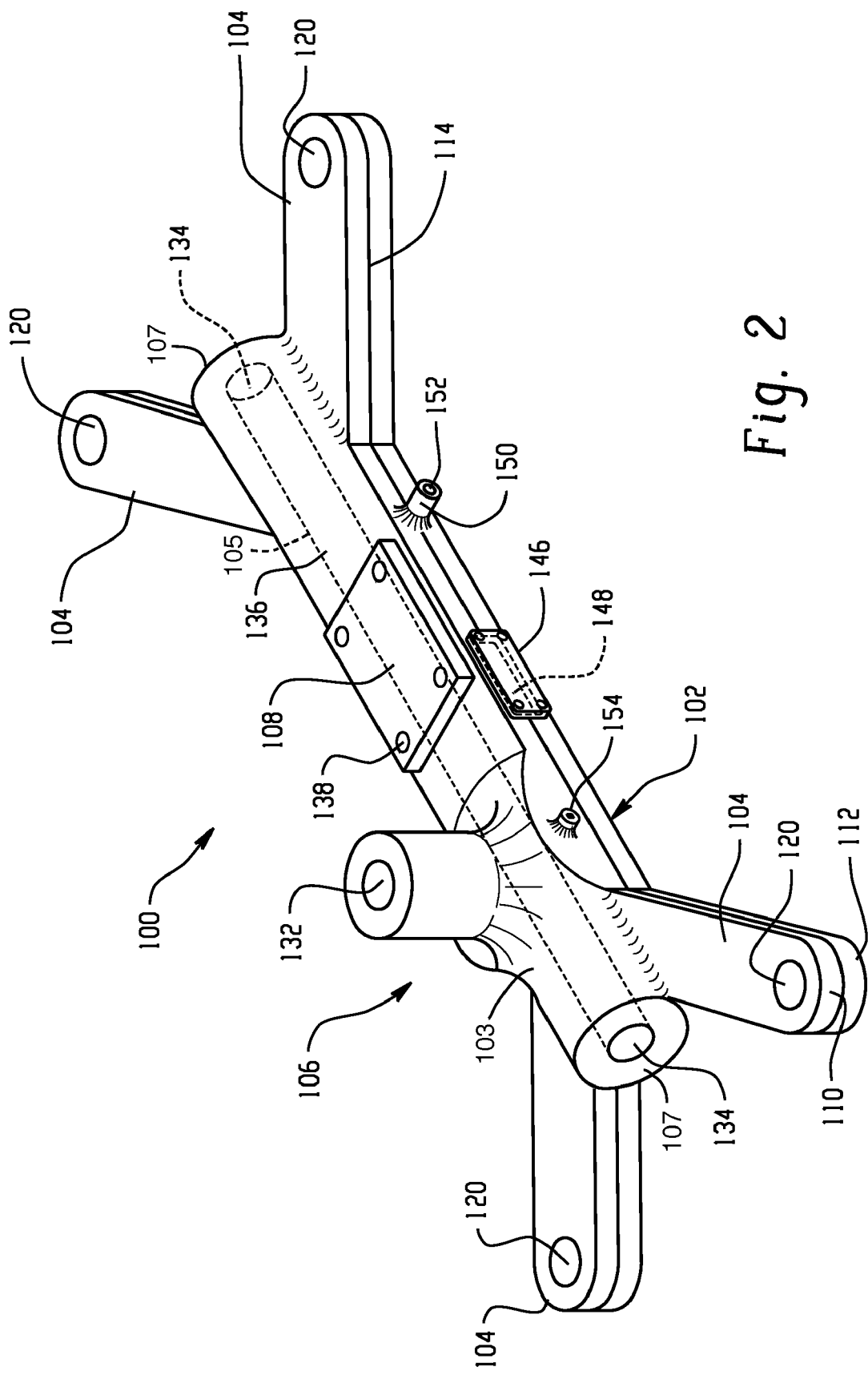
FIG. 2 shows a steering gear housing according to an embodiment of the present invention.
Figure 3:
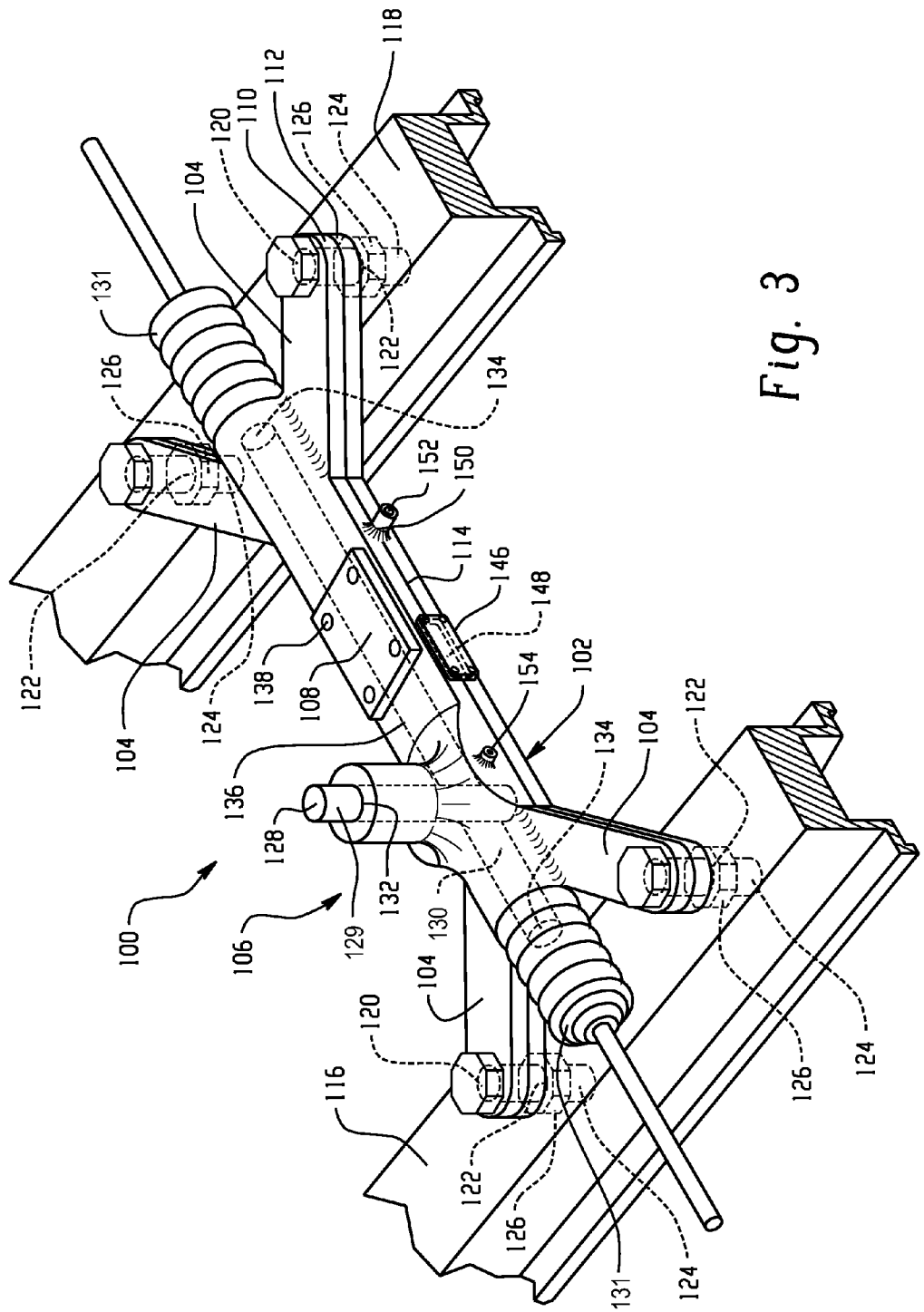
FIG. 3 shows a steering gear assembly incorporating the housing of FIG. 2 according to an embodiment of the present invention.

The general arrangement of an integrated steering gear, frame structure and engine mount base 100 (hereinafter "integrated structure") for a vehicle is shown in FIGS. 2 and 3 according to an embodiment of the present invention. Integrated structure 100 comprises in part a housing 102, at least one mounting portion 104 at each of opposing ends of the housing, a steering gear housing portion 106 and an engine mount base 108.

Housing 102 is elongate, generally hollow, and sized and shaped to at least partially enclose components of a steering gear and to provide an engine mount base. Housing 102 includes at least one sidewall 103 enveloping a hollow portion 105, as well as a pair of opposing endwalls 107. The housing 102 also functions as a structural member of a vehicle frame, as detailed further below. Housing 102 may be made from any material with sufficient strength and durability to withstand the environment and forces to which a vehicle steering gear, frame member and engine mount are typically exposed. Example materials include, without limitation, metals such as steel and aluminum. Any suitable method or combination of methods may be employed to produce housing 102 including, without limitation, forging, casting, stamping and machining. Housing 102 may also be stress-relieved by any acceptable method for the given material and manufacturing process, including, but not limited to, heat treating, shot peening, or vibratory stress relief. Lastly, housing 102 may be finished in any desired manner such as, without limitation, painting, coating or plating, or may be left unfinished.

In alternate embodiments housing 102 may be may be manufactured as a unitary piece or from a plurality of subcomponents that are coupled together. For example, housing 102 may include an upper portion 110 and a lower portion 112 joined together at a seam 114 as shown in FIG. 2. If housing 102 is made from a plurality of subcomponents, the subcomponents may be joined in any conventional manner including, without limitation, fasteners, screws, nuts and bolts, connectors, adhesive and welding. Depending upon the joining process selected the subcomponents 110, 112 may be either permanently joined or detachable from each other.

Mounting portions 104 are located proximate opposing ends of housing 102 and extend away from sidewall 103. Mounting portions 104 are sized and shaped to directly interface with a left-hand longitudinal frame member 116 and a right-hand longitudinal frame member 118, as shown in FIG. 3. Mounting portions 104 may further include openings 120 aligned with corresponding openings 122 in frame members 116, 118 for receipt of fasteners such as bolts 124 and nuts 126 to secure the mounting portions to the frame members. The shape and number of mounting portions 104 may be varied from that shown to suit a particular vehicle configuration and may include, but are not limited to, the fastening methods shown in FIGS. 3 and 4.

Mounting portions 104 may be integral, unitary portions of housing 102 as shown in FIG. 2 or, alternatively, may be detachable. If mounting portions 104 are detachable, they may be joined to housing 102 in any conventional manner including, without limitation, fasteners, screws, nuts and bolts, connectors, adhesive and welding. Depending upon the joining process selected, the mounting portions 104 may be permanently joined to housing 102 or detachable therefrom.

Steering gear housing portion 106 is sized and shaped to accommodate various components of a conventional steering gear that are at least partially disposed within the housing. Such components may include, without limitation, a steering gear input 128 that includes a pinion 129, a rack 130, and a set of opposingly-oriented tie rods 131, as well as power steering components and various steering gear components internal to housing 102. Steering gear housing portion 106 may be formed in housing 102 using any suitable method or combination of methods including, without limitation, forging, casting, stamping and machining Steering gear input 128 extends from housing 102 through an aperture 132 and tie rods 131 extend through apertures 134 in endwalls 107. Hollow portion 105 extends between apertures 134, as shown in FIG. 2.

Figure 1:
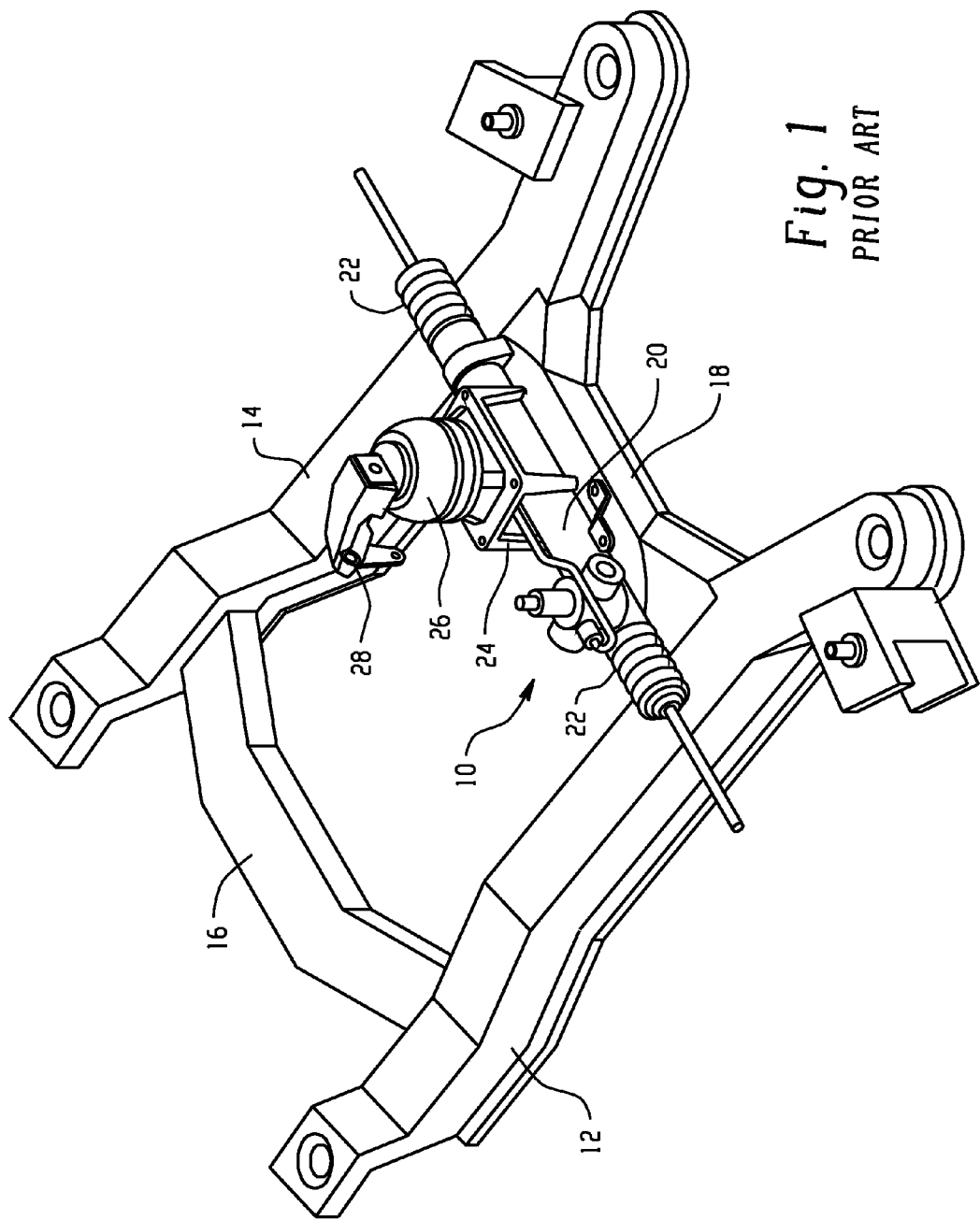
FIG. 1 shows a prior art steering gear and vehicle frame assembly.

Engine mount base 108 is integrated into housing 102 and is sized and shaped to receive an engine mount such as, for example, engine mount 26 of FIG. 1. In some embodiments engine mount base 108 may be integral to housing 102 and may be formed using any suitable method or combination of methods including, without limitation, forging, casting, stamping and machining In other embodiments engine mount base 108 may be made separately and joined to housing 102 in any conventional manner including, without limitation, fasteners, screws, nuts and bolts, connectors, adhesive and welding. Depending upon the joining process selected engine mount base 108 may be permanently joined to housing 102 or detachable therefrom. Engine mount base 108 may further include one or more receptacles 138, such as threaded openings, which may be used with fasteners such as threaded bolts (not shown) to secure the engine mount 26 to the engine mount base. Engine mount base 108 is shown situated at an upper surface 136 of sidewall 103 of housing 102 in FIG. 2 for purposes of illustration, but may be located on any surface of the housing.

Figure 4:
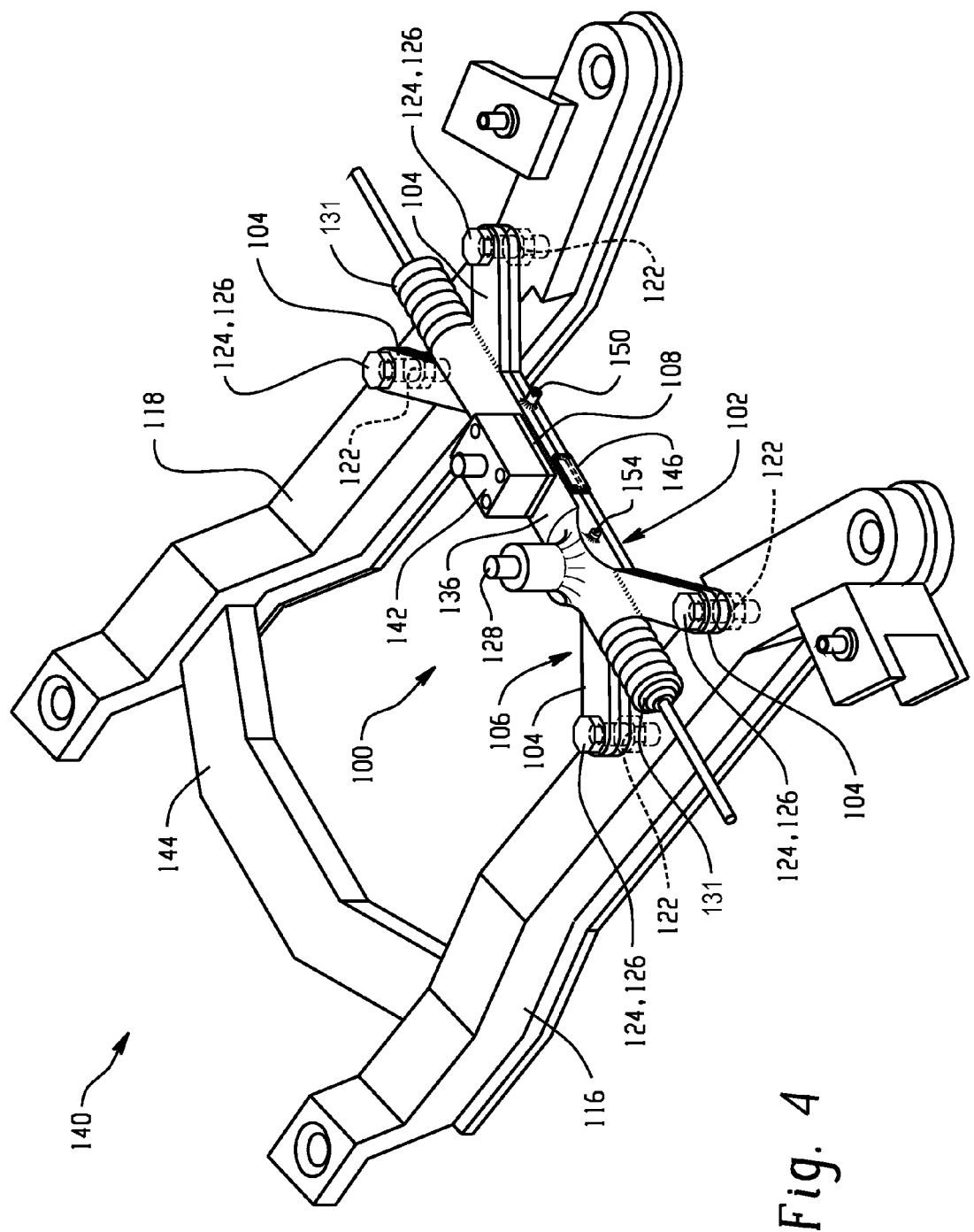
FIG. 4 shows the steering gear assembly of FIG. 3 coupled to a vehicle frame according to an embodiment of the present invention.

FIG. 4 shows integrated structure 100 mounted to a vehicle support frame 140 including spaced-apart left frame member 116 and right frame member 118. Integrated structure 100 extends between left frame member 116 and right frame member 118 and is secured to both frame members with fasteners 124, 126. In this condition, integrated structure 100 functions as a subframe member of support frame 140. Tie rods 131 extend from housing 102 and are coupled to steerable wheels (not shown) of the vehicle in any conventional manner. An engine mount 142 is attached to engine mount base 108. The depicted support frame includes forward cross member 144 extending between left frame member 116 and right frame member 118 to provide additional stiffness and to contribute to the structural integrity of support frame 140.

As can be seen from FIG. 4, integrated structure 100 provides a unitary device comprising a steering gear, an engine mount base and a subframe member in a single unit. Housing 102 at least partially encloses the steering gear components, eliminating the need for separate enclosures for the components. The arrangement of integrated structure 100 also eliminates the need for an engine mount adapter such as base bracket 24 of FIG. 1. Instead, an engine mount 142 may be directly attached to engine mount base 108 of housing 102. The integrated structure 100 thus offers a reduction in weight, component cost and assembly labor as compared to present steering gear assemblies.

With reference again to FIGS. 2 and 3, in some embodiments of the present invention housing 102 may include one or more access panels 146 that are detachably coupled to housing 102 and selectably close off an access opening 148. Access panel 146 may be selectably detached, providing access to the interior of housing 102 through opening 148 for inspection, maintenance and servicing of portions of integrated structure 100 that are within the housing.

With continued reference to FIGS. 2 and 3, some embodiments of the present invention may also include one or more accessory mounts 150. In some embodiments accessory mount 150 may be integral to housing 102 and may be formed using any suitable method or combination of methods including, without limitation, forging, casting and machining. In other embodiments accessory mount 150 may be made separately and joined to housing 102 in any conventional manner including, without limitation, fasteners, screws, nuts and bolts, connectors, adhesive and welding. Depending upon the joining process selected accessory mount 150 may be permanently joined to housing 102 or detachable therefrom. Accessory mount 150 may be sized and shaped to receive a particular accessory such as, for example, a not-shown bracket or a wiring harness clamp. Accessory mount 150 may include an accessory receptacle 152, such as a threaded opening, which may be used with fasteners such as threaded bolts (not shown) to secure said accessories.

While this invention has been shown and described with respect to a detailed embodiment thereof, it will be understood by those skilled in the art that changes in form and detail thereof may be made without departing from the scope of the claims of the invention. For example, the shape and size of the integrated system 100 and its features may be varied to suit a particular vehicle, including, without limitation, the addition of a rack guide adjust screw 154 as shown in FIGS. 2, 3 and 4.

What is claimed is:

1. An integrated steering gear, frame structure and engine mount base for a vehicle, comprising:
    an elongate housing that includes:
        at least one sidewall,
        a pair of opposing endwalls formed as a unitary piece with the at least one sidewall,
        an aperture in each endwall,
        a hollow portion extending between the apertures of the endwalls, the hollow portion being enveloped by the at least one sidewall, and
        at least one mounting portion proximate each of a first housing end and a second opposing housing end, the at least one mounting portion extending from the at least one sidewall;
    a steering gear comprising a steering gear input and a pair of opposingly-oriented tie rods, the steering gear being at least partially disposed within the hollow portion of the housing such that the steering gear input and the tie rods extend from the interior of the housing; and
    an engine mount base integrated into the housing, the engine mount base being sized and shaped to receive an engine mount,
    the integrated steering gear, frame structure and engine mount base being mountable to a support frame of the vehicle to function as a subframe member of said support frame.

2. The integrated steering gear, frame structure and engine mount base of claim 1, further comprising a plurality of receptacles in the engine mount base to couple the engine mount to the housing.

3. The integrated steering gear, frame structure and engine mount base of claim 1, further comprising:
    an opening in the housing for accessing an interior portion of the housing; and
    a cover detachably coupled to the housing to selectably close off the opening.

4. The integrated steering gear, frame structure and engine mount base of claim 1 wherein the housing further includes at least one accessory mount.

5. The integrated steering gear, frame structure and engine mount base of claim 4 wherein the accessory mount further includes an accessory receptacle.

6. The integrated steering gear, frame structure and engine mount base of claim 1, wherein the housing is made from metal.

7. The integrated steering gear, frame structure and engine mount base of claim 1 wherein the housing is made from a unitary piece.

8. The integrated steering gear, frame structure and engine mount base of claim 1 wherein the housing is made from a plurality of subcomponents.

9. The integrated steering gear, frame structure and engine mount base of claim 1 wherein the housing is produced by at least one of forging, casting, stamping or machining.

10. The integrated steering gear, frame structure and engine mount base of claim 1 wherein the at least one mounting portion is a unitary portion of the at least one sidewall.

11. An integrated steering gear, frame structure and engine mount base for a vehicle, comprising:
    an elongate metal housing that includes:
        at least one sidewall,
        a pair of opposing endwalls formed as a unitary piece with the at least one sidewall,
        an aperture in each endwall,
        a hollow portion extending between the apertures of the endwalls, the hollow portion being enveloped by the at least one sidewall, and
        at least one mounting portion proximate each of a first housing end and a second opposing housing end, the at least one mounting portion extending from the at least one sidewall;
    a steering gear comprising a steering gear input and a pair of opposingly-oriented tie rods, the steering gear being at least partially disposed within the hollow portion of the housing such that the steering gear input and the tie rods extend from the interior of the housing;
    an engine mount base integrated into the housing, the engine mount base being sized and shaped to receive an engine mount; and
    a plurality of receptacles in the engine mount base,
    the integrated steering gear, frame structure and engine mount base being mountable to a support frame of the vehicle to function as a subframe member of said support frame.

12. The integrated steering gear, frame structure and engine mount base of claim 11 wherein the at least one mounting portion is a unitary portion of the at least one sidewall.

13. A method of integrating a steering gear and frame structure with an engine mount, comprising the steps of:
    providing an elongate housing that includes:
        at least one sidewall,
        a pair of opposing endwalls formed as a unitary piece with the at least one sidewall,
        an aperture in each endwall,
        a hollow portion extending between the apertures of the endwalls, the hollow portion being enveloped by the at least one sidewall, and
        at least one mounting portion proximate each of a first housing end and a second opposing housing end, the at least one mounting portion extending from the at least one sidewall;
    providing a steering gear comprising a steering gear input and a pair of opposingly-oriented tie rods;
    integrating an engine mount base into the housing, the engine mount base being sized and shaped to receive an engine mount; and
    assembling the steering gear within the hollow portion of the housing such that the steering gear input and the tie rods extend from the interior of the housing,
    the integrated steering gear, frame structure and engine mount base being mountable to a support frame of a vehicle to function as a subframe member of said support frame.

14. The method of claim 13, further comprising the step of providing a plurality of receptacles in the engine mount base to secure the engine mount to the housing.

15. The method of claim 13, further comprising the steps of:
   forming an opening in the housing for accessing an interior portion of the housing; and
   detachably coupling a cover to the housing to selectably close off the opening.

16. The method of claim 13, further comprising the step of providing the housing with at least one accessory mount.

17. The method of claim 16, further comprising the step of forming an accessory receptacle in the accessory mount.

18. The method of claim 13 wherein the at least one mounting portion is a unitary portion of the at least one sidewall.

* * * * *